No. 652,386. Patented June 26, 1900.
G. W. CRAWFORD.
VEHICLE COUPLING.
(Application filed Nov. 23, 1898.)
(No Model.)
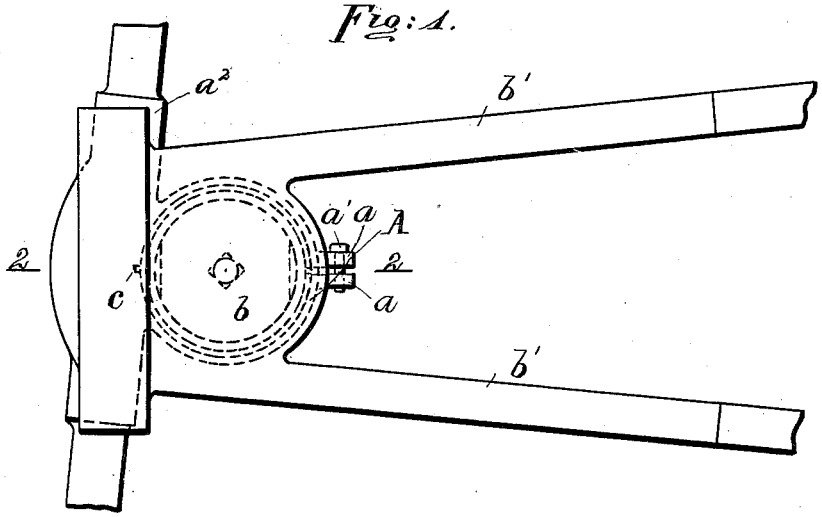
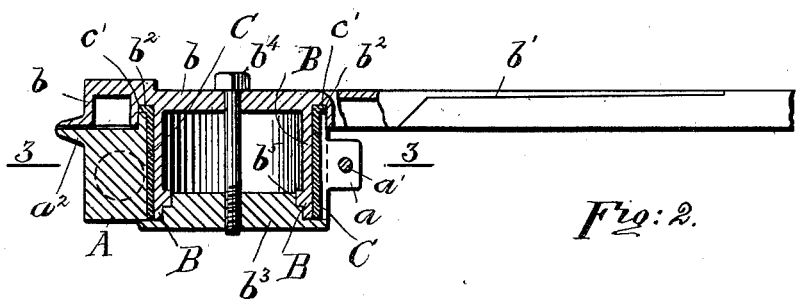
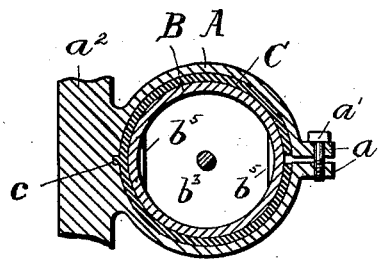
Witnesses
Inventor
George W. Crawford.
By his Attorney

UNITED STATES PATENT OFFICE.

GEORGE W. CRAWFORD, OF DELHI, NEW YORK, ASSIGNOR OF ONE-HALF TO JOHN F. ALDRICH, AGENT, OF ONEIDA, NEW YORK.

VEHICLE-COUPLING.

SPECIFICATION forming part of Letters Patent No. 652,386, dated June 26, 1900.

Application filed November 23, 1898. Serial No. 697,284. (No model.)

*To all whom it may concern:*

Be it known that I, GEORGE W. CRAWFORD, a citizen of the United States, residing at Delhi, in the county of Delaware and State of New York, have invented certain new and useful Improvements in Vehicle-Couplings, of which the following is a specification.

My invention relates to vehicle-couplings, and particularly to that class known as "fifth-wheels."

I will describe a coupling embodying my invention and then point out the novel features thereof in the claims.

In the accompanying drawings, Figure 1 is a top view of a coupling embodying my invention. Fig. 2 is a vertical section thereof, taken on the line 2 2. Fig. 3 is a detail transverse section taken on the line 3 3 of Fig. 2.

Similar letters of reference refer to corresponding parts in all the figures of the drawings.

A represents one part of the coupling, B a second part, and C a wearing-piece, preferably of brass, that is placed between the parts A and B. The part A of the coupling is in the form of a split ring, sleeve, or cylinder, the ends $a$ of which are turned outward to receive a screw $a'$, which is adapted to bring the ends together or separate them. Any other device or means may be employed for bringing together or separating these ends.

The part A is carried by the front axle $a^2$ and is preferably integral therewith, though it may be separate from the axle and secured thereto in any desired manner.

The part B of the coupling is in the form of a ring, sleeve, or cylinder. It is preferably cast integral with the perch-plate $b$, that carries the perch-straps $b'$, which straps are secured to the wagon-body. A recess $b^2$ is provided in the part $b$, in which the upper edge of the split sleeve A projects and also the flanged edge of the brass wearing-piece.

$b^3$ represents a disk provided at the lower end of the sleeve B and held thereto by a bolt $b^4$. The disk $b^3$ preferably has a locking engagement with the sleeve B, so that it will not turn relatively to the sleeve B. This may be accomplished in any desired manner—as, for example, by providing flat faces on the disk or sleeve B, which abut, as shown at $b^5$.

The brass wearing-piece C is split, and it is provided with a feather $c$, fitting in a groove in the sleeve A, so that it will turn with the sleeve. If desired, the wearing-piece may be locked to the sleeve B, in which case the sleeve A would turn on it, or, if desired, it may be loose. It is also provided with a flange $c'$ at its upper edge. This flange is preferably of such thickness that the parts $b$ and $a^2$ will not contact with each other, thereby confining most of the friction between the top of flange $c$ and the contacting surface of the perch-plate.

A material advantage of a coupling constructed in accordance with my invention is that the two sleeves take the place of a king-bolt, and owing to the vertical faces of the two sleeves being in contact the possibility of any looseness occurring between these parts by reason of any strain on them produced by moving the vehicle by its pole or thills is materially avoided. Any looseness that may occur can be easily taken up by bringing the ends of the sleeve A together.

Having thus described my invention, what I claim as new is—

1. A coupling for a vehicle, comprising a cylinder carried by the body of the vehicle, a cylinder carried by an axle of said vehicle and adapted to receive the cylinder carried by the body of the vehicle, and means for regulating the friction between the two cylinders, substantially as described.

2. A coupling for a vehicle comprising a cylindrical sleeve carried by the body of the vehicle, a split cylinder carried by an axle of said vehicle which receives the cylinder carried by the body, a wearing-piece between the two cylinders and means for bringing together and separating the ends of the split cylinder substantially as described.

3. A coupling for a vehicle comprising a sleeve or cylinder carried by the vehicle-body, a split sleeve or cylinder carried by an axle of the vehicle which receives the sleeve or cylinder carried by the body, means for bringing together and separating the ends of said split sleeve or cylinder, and a split sleeve or cylindrical wearing-piece inserted between the two sleeves or cylinders, substantially as described.

4. A coupling for a vehicle comprising a sleeve or cylinder that is carried by the body of the vehicle, a sleeve or cylinder carried by an axle of the vehicle, and receiving the first-mentioned sleeve or cylinder, and a wearing-piece inserted between the two sleeves or cylinders, said wearing-piece being provided with a flange which fits over the upper edge of the sleeve or cylinder carried by the axle, and on which the sleeve or cylinder carried by the body bears, substantially as described.

5. A coupling for a vehicle comprising a cylinder carried by the vehicle-body, a cylinder carried by an axle of the vehicle, and a cylindrical wearing-piece having an annular flange, said cylinders being arranged one within the other, and said wearing-piece being located between the cylinders with its flange between an end of one cylinder and an adjacent part on the other cylinder.

6. A coupling for a vehicle comprising a cylindrical sleeve carried by the vehicle-body, a cylindrical sleeve carried by an axle of the vehicle and receiving the first-mentioned cylindrical sleeve, a cylindrical wearing-piece inserted between the said sleeves, a lateral extension formed on one of said sleeves, and a flange formed on said wearing-piece and fitting between the said extension of one sleeve, and an end of the other sleeve.

In testimony whereof I have signed my name to this specification in the presence of two subscribing witnesses.

GEORGE W. CRAWFORD.

Witnesses:
W. LAIRD GOLDSBOROUGH,
GEO. E. CRUSE.